United States Patent
Yang et al.

(10) Patent No.: US 10,615,668 B2
(45) Date of Patent: Apr. 7, 2020

(54) COIL MULTI-COOLING PATH TYPE DRIVE MOTOR AND ECO-FRIENDLY VEHICLE HAVING THE SAME

(71) Applicants: Hyundai Motor Company, Seoul (KR); Kia Motors Corporation, Seoul (KR)

(72) Inventors: Hong-Seok Yang, Gyeonggi-do (KR); Myung-Gyu Kim, Seoul (KR); Hee-Ra Lee, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 105 days.

(21) Appl. No.: 15/838,543

(22) Filed: Dec. 12, 2017

(65) Prior Publication Data
US 2019/0097500 A1 Mar. 28, 2019

(30) Foreign Application Priority Data
Sep. 26, 2017 (KR) .......................... 10-2017-0123949

(51) Int. Cl.
| | |
|---|---|
| *H02K 1/18* | (2006.01) |
| *H02K 1/20* | (2006.01) |
| *H02K 5/20* | (2006.01) |
| *H02K 7/108* | (2006.01) |
| *H02K 9/02* | (2006.01) |
| *H02K 9/19* | (2006.01) |
| *H02K 9/193* | (2006.01) |
| *H02K 11/225* | (2016.01) |
| *B60K 6/405* | (2007.10) |

(52) U.S. Cl.
CPC .............. *H02K 9/193* (2013.01); *H02K 1/185* (2013.01); *H02K 1/20* (2013.01); *H02K 5/20* (2013.01); *H02K 7/108* (2013.01); *H02K 9/02* (2013.01); *H02K 9/19* (2013.01); *H02K 11/225* (2016.01); *B60K 6/405* (2013.01)

(58) Field of Classification Search
CPC ........ H02K 9/193; H02K 11/225; H02K 9/19; H02K 7/108; H02K 9/02; H02K 5/20; H02K 1/20; H02K 1/185; B60K 6/405
USPC ........................................................ 310/52, 54
See application file for complete search history.

(56) References Cited

U.S. PATENT DOCUMENTS

| | | | | |
|---|---|---|---|---|
| 5,372,213 A | * | 12/1994 | Hasebe | ..................... B60K 1/02 180/65.6 |
| 5,875,691 A | * | 3/1999 | Hata | ....................... B60K 6/365 475/5 |

(Continued)

FOREIGN PATENT DOCUMENTS

| | | |
|---|---|---|
| KR | 10-0969037 B1 | 7/2010 |
| KR | 10-1261959 B1 | 5/2013 |

(Continued)

*Primary Examiner* — John K Kim
(74) *Attorney, Agent, or Firm* — Mintz Levin Cohn Ferris Glovsky and Popeo, P.C.; Peter F. Corless (57) ABSTRACT

A drive motor is provided in which a coil is cooled in a three-dimensional manner. The drive motor includes a coil multi-cooling path through which oil collected by centrifugal force of a rotor flows to an engine clutch from an internal space of a rotor sleeve to be scattered in forward and backward directions of a coil and simultaneously flows to a resolver from an external space of the rotor sleeve to be scattered in the backward direction of the coil.

11 Claims, 5 Drawing Sheets

(56) References Cited

U.S. PATENT DOCUMENTS

| | | | | |
|---|---|---|---|---|
| 6,364,042 B1* | 4/2002 | Joachim | ................ | B60K 6/387 |
| | | | | 180/65.25 |
| 6,863,140 B2* | 3/2005 | Noreikat | ................ | B60K 6/40 |
| | | | | 180/65.23 |
| 7,293,637 B2* | 11/2007 | Janson | ................ | B60K 6/48 |
| | | | | 180/65.25 |
| 7,402,923 B2* | 7/2008 | Klemen | ................ | B60K 6/365 |
| | | | | 180/339 |
| 8,425,376 B2* | 4/2013 | Schoenek | ................ | B60K 6/405 |
| | | | | 180/65.22 |
| 9,145,961 B2* | 9/2015 | Suzuki | ................ | B60K 6/448 |
| 9,653,961 B2 | 5/2017 | Silva | | |
| 10,442,282 B2* | 10/2019 | Shinohara | ................ | B60K 1/02 |
| 2011/0298314 A1* | 12/2011 | Atarashi | ................ | B60K 6/405 |
| | | | | 310/54 |
| 2012/0032538 A1* | 2/2012 | Kasuya | ................ | B60K 6/48 |
| | | | | 310/54 |
| 2015/0027273 A1* | 1/2015 | Iwase | ................ | H02K 5/225 |
| | | | | 74/665 B |
| 2015/0239332 A1* | 8/2015 | Okuda | ................ | B60K 6/40 |
| | | | | 60/716 |
| 2019/0097500 A1* | 3/2019 | Yang | ................ | H02K 7/108 |

FOREIGN PATENT DOCUMENTS

| | | |
|---|---|---|
| KR | 2016-0050197 A | 5/2016 |
| KR | 10-2712147 | 3/2017 |

\* cited by examiner

COIL MULTI-COOLING PATH TYPE DRIVE MOTOR AND ECO-FRIENDLY VEHICLE HAVING THE SAME

CROSS-REFERENCE TO RELATED APPLICATIONS

This application claims priority to Korean Patent Application No. 10-2017-0123949, filed on Sep. 26, 2017, which is incorporated herein by reference in its entirety.

BACKGROUND

Field of the Invention

The present invention relates to drive motor cooling; and, more particularly, to an eco-friendly vehicle using a drive motor in which a coil is cooled in a three-dimensional manner using cooling paths formed at multiple positions.

Description of Related Art

In general, a drive motor for an eco-friendly vehicle is used to implement a traveling mode in which an electric vehicle (EV) is driven by a motor and a traveling mode in which a hybrid electric vehicle (HEV) is driven by combination of a motor and an engine. This eco-friendly vehicle is a hybrid vehicle, and includes a hybrid electric vehicle (HEV), a plug-in hybrid electric vehicle (PHEV), an electric vehicle (EV), a fuel cell electric vehicle (FCEV), a mile hybrid electric vehicle (MHEV), etc.

The drive motor includes a stator around which a coil is wound and which is coupled into a motor housing, and a rotor that is disposed in the stator with a predetermined gap interposed therebetween. The drive motor includes a cooling structure that cools heat generated by the current applied to the coil and the eddy current due to counter electromotive force. In particular, the cooling structure uses an oil cooling method according to the characteristic of the eco-friendly vehicle to which the driver motor is mounted using a transmission housing, and the oil cooling method allows heat generated by the coil in the motor housing to be absorbed and cooled using an auto transmission fluid as a cooling oil (hereinafter, referred to as oil).

For example, the oil cooling method uses a scattering cooling path connected from an engine clutch to a rotor sleeve and a bobbin, and the oil within the rotor sleeve is scattered outward of the rotor sleeve through the scattering cooling path by rotation of the rotor to cool the coil wound around the bobbin by the oil scattered through the bobbin. As a result, it is possible to prevent the drive motor from being damaged due to heat even when the drive motor is driven for a substantial period of time and thus to maintain the performance of the drive motor. However, the oil cooling method has limitations since the scattering of oil through the scattering cooling path does not have a large effect in cooling the coil.

In particular, the effect of cooling the coil by the scattered oil does not affect the rear of the coil since the scattering cooling path in the oil cooling method is formed in one place in the coupling direction of an engine clutch and particularly oil is scattered only on the front of the coil in the rotor sleeve and the bobbin. The direction in which the coil wound around the stator is directed in the coupling direction of the engine clutch in the width of the drive motor is defined as the front of the coil, and the direction opposite to the above direction is defined as the rear of the coil. Accordingly, the oil cooling method causes a difference in cooling effect since a relatively small amount of oil is scattered onto the rear of the coil rather than the front of the coil, which may lead to non-uniform motor cooling performance. Thus, it requires a lot of effort to control the temperature of the drive motor in the eco-friendly vehicle.

SUMMARY

An exemplary embodiment of the present invention is directed to a coil multi-cooling path type drive motor that includes a resolver cooling path in addition to a coil cooling path and an engine clutch cooling path to scatter oil on the front and rear of a coil throughout the width of a rotor sleeve to maximize coil cooling performance, and particularly that significantly increases an effect of directly cooling a stator space by scattering oil required to drive a rotor together with oil flowing to an engine clutch and a resolver, and an eco-friendly vehicle having the same.

Other objects and advantages of the present invention may be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an exemplary embodiment of the present invention, a drive motor may include a coil multi-cooling path through which oil collected by centrifugal force of a rotor flows to an engine clutch from an internal space of a rotor sleeve to be scattered in forward and backward directions of a coil and simultaneously flows to a resolver from an external space of the rotor sleeve to be scattered in the backward direction of the coil. The oil flowing to the resolver may be mixed with the oil flowing to the engine clutch to be scattered in the backward direction of the coil.

The coil multi-cooling path may include a coil cooling path through which the oil flowing to the engine clutch may be scattered in the forward direction of the coil, an engine clutch cooling path through which the oil flowing to the engine clutch may be scattered in the back direction of the coil, and a resolver cooling path through which the oil flowing to the resolver may be scattered in the backward direction of the coil. The coil cooling path and the engine clutch cooling path may be formed at intervals in a circular body that defines the internal space of the rotor sleeve, and the resolver cooling path may be formed in a resolver boss that protrudes toward a shaft boss of the rotor sleeve to be blocked from the internal space.

The coil cooling path may have a front bobbin scattering aperture formed radially of a circular body of the rotor sleeve defining the internal space, and a front coil scattering groove formed in a bobbin coupled to the coil so that the oil scattered from the front bobbin scattering aperture may be scattered in the forward direction of the coil. The engine clutch cooling path may have a rear bobbin scattering aperture formed in the rotor sleeve, and a rear coil scattering groove formed in a bobbin coupled to the coil to scatter the oil scattered from the rear bobbin scattering aperture in the backward direction of the coil. The rear bobbin scattering aperture may include an inlet passage, a connection passage, and an outlet passage. The inlet passage may have a rectilinear shape and operate as an inlet for inflow of the oil. The outlet passage may be formed in the rotor sleeve to communicate with the other end of the connection passage at a right angle, and may operate as an inlet for inflow of the oil scattered from the resolver cooling path to flow to the resolver together with an outlet through which the oil is scattered in the backward direction of the coil. The connection passage may connect the inlet passage to the outlet passage.

The resolver cooling path may have a resolver passage formed in a resolver boss of the rotor sleeve at an angle of inclination to be directed toward the engine clutch cooling path to transfer the oil flowing to the resolve to the engine clutch cooling path through the resolver passage, and an oil collection protrusion formed in the rotor sleeve having the engine clutch cooling path formed therein to prevent the oil flowing to the resolver from dispersing from the engine clutch cooling path. The coil may be wound around a stator, and the stator may be cooled by coolant circulated in a cooling channel.

In accordance with another exemplary embodiment of the present invention, an eco friendly vehicle includes a coil multi-cooling path having a coil cooling path and an engine clutch cooling path, formed at intervals in a rotor sleeve and thus, oil collected by centrifugal force of a rotor may flow to an engine clutch from an internal space of the rotor sleeve to be scattered in forward and backward directions of a coil, and a resolver cooling path through which the oil flowing to a resolver from an external space of the rotor sleeve may be transferred to the engine clutch cooling path to be scattered in the backward direction of the coil, and an automatic transmission fluid (ATF) supplied as the oil. The engine clutch may be coupled to a drive motor. The ATF may be supplied from a transmission.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Exemplary embodiments of the present invention will be described below in more detail with reference to the accompanying drawings. The present invention may, however, be embodied in different forms and should not be construed as limited to the exemplary embodiments set forth herein. Rather, these exemplary embodiments are provided so that this disclosure will be thorough and complete, and will fully convey the scope of the present invention to those skilled in the art. Throughout the disclosure, like reference numerals refer to like parts throughout the various figures and exemplary embodiments of the present invention.

Figure 1:
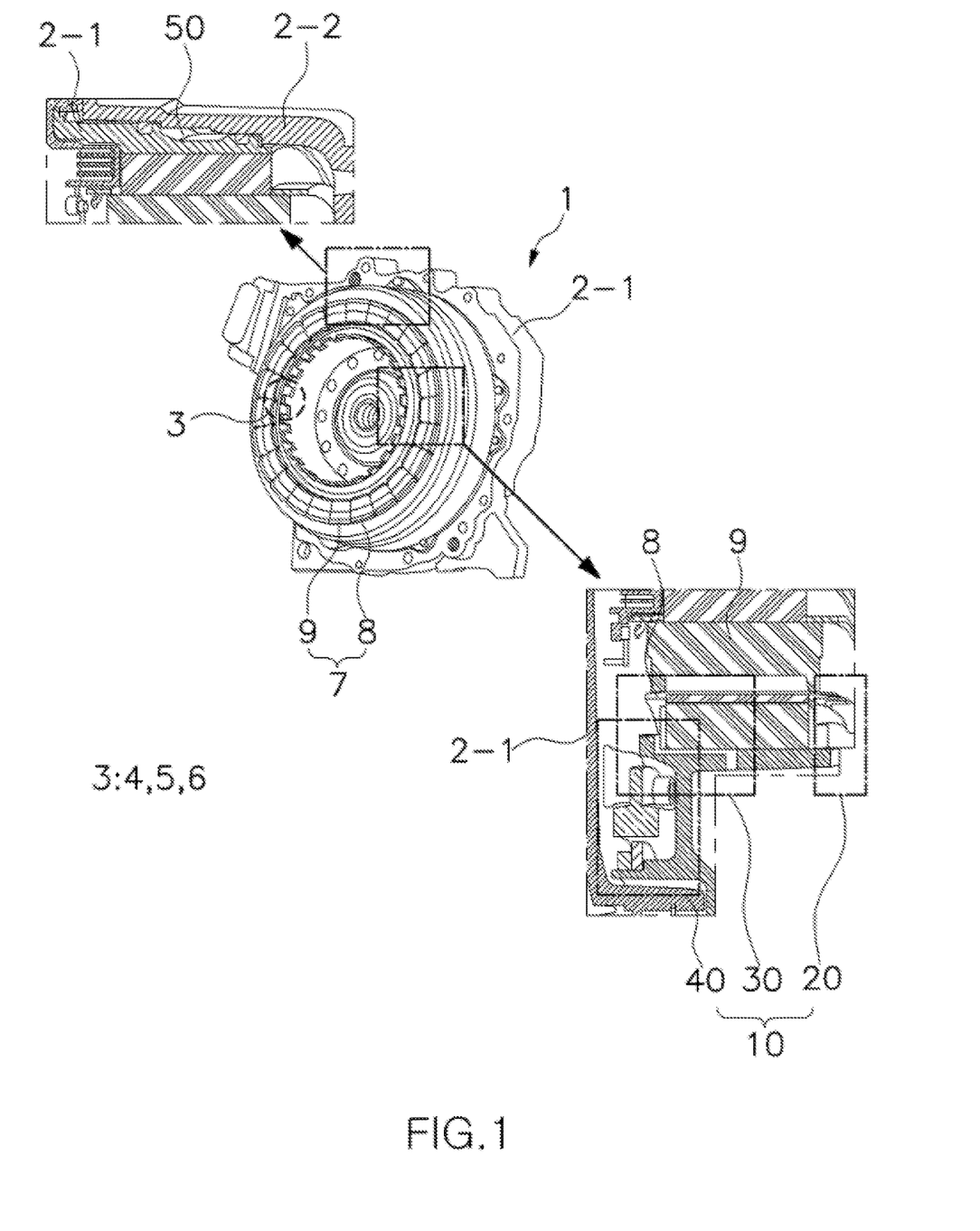
FIG. 1 is a view illustrating a drive motor having three oil scattering paths as a coil multi-cooling path according to an exemplary embodiment of the present invention.

Referring to FIG. 1, a drive motor 1 may include a motor body 2-1, a coil multi-cooling path 10, and a cooling channel 50. In particular, the motor body 2-1 may include a rotor 3 and a stator 7 therein, and may be coupled to an engine by a motor housing 2-2 having the cooling channel 50 formed therein to position an engine clutch to cut off and supply the power of the engine within the rotor 3. For example, the rotor 3 may include a rotor sleeve 4 formed of a circular body having an axial aperture and an open internal space, a retainer 5 that has an annular ring shape, and a rotor plate 6 that has an annular ring shape. Particularly, the retainer 5 may be coupled to the rotor sleeve 4, and the rotor plate 6 may be coupled to the retainer 5. The stator 7 may include a bobbin 8 and a coil 9 wound around the bobbin 8. The bobbin 8 may surround the rotor 3 and a current may be supplied to the coil 9.

Accordingly, the rotor 3 may be rotated by the current supplied to the stator 7, and an output shaft may be rotated along with the rotation of the rotor 3 and thus, the drive motor 1 may be configured to output torque. In particular, the coil multi-cooling path 10 forms an oil scattering path through which oil suctioned to the motor body 2-1 by centrifugal force according to the rotation of the rotor 3 may be scattered intensively in forward and backward directions of the coil 9. For example, the coil multi-cooling path 10 may include a coil cooling path 20 that leads in the forward direction of the coil 9 from the internal space of the rotor sleeve 4 to scatter oil in the forward direction of the coil 9 through the coil cooling path 20.

The coil multi-cooling path 10 may include an engine clutch cooling path 30 that leads in the backward direction of the coil 9 from the internal space of the rotor sleeve 4, and a resolver cooling path 40 that leads in the backward direction of the coil 9 from the external space of the rotor sleeve 4 connected to a resolver, which is positioned inside the drive motor, to scatter oil in the backward direction of the coil 9 through the engine clutch cooling path 30 and the resolver cooling path 40. In particular, the forward direction of the coil 9 is defined as a direction directed outward of the drive motor 1 when the rotor 3 and the stator 7 are assembled to the motor body 2-1, and the backward direction of the coil 8 is defined as a direction directed inward of the drive motor 1.

Therefore, the coil multi-cooling path 10 may be divided into the coil cooling path 20 and the engine clutch cooling path 30, formed independently at intervals in the rotor sleeve 4 of the rotor 3, and the resolver cooling path 40 formed in the rotor sleeve 4 of the rotor 3 and vertically spaced apart from the engine clutch cooling path 30. Thus, the exposed front of the coil 9 may be cooled by scattering oil flowing to the engine clutch through the coil cooling path 20. In addition, the exposed rear of the coil 9 may be cooled by scattering oil, flowing to the engine clutch, through the engine clutch cooling path 30 and scattering oil, flowing to the resolver, through the resolver cooling path 40. As a result, the drive motor 1 may have an increased cooling efficiency since the coil 9 is directly cooled by oil through the coil multi-cooling path 10, thereby contributing to an improvement in traveling performance of EVs.

In particular, the cooling channel 50 may be formed in the motor housing 2-2 for inflow and outflow of coolant to cool the inside of the motor body 2-1. In the layout of the cooling channel 50, the cooling channel 50 may surround the motor body 2-1 in a zigzag form and may connected to a coolant circulation system. The coolant circulation system may be constituted using an engine cooling system in the eco-friendly vehicle such as an HEV, whereas it may be constituted independently in the eco-friendly vehicle such as an EV.

Figure 2:
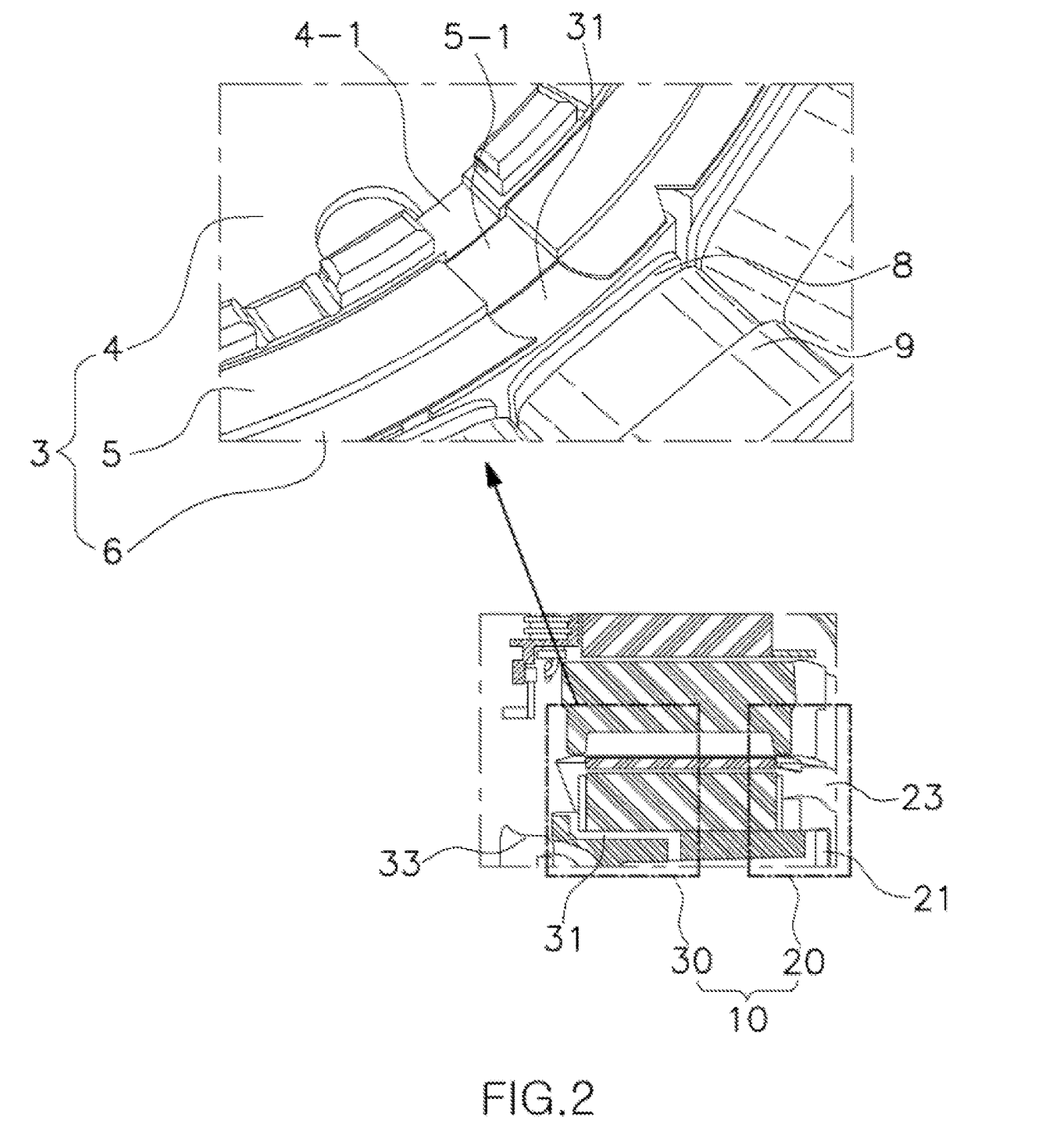
FIG. 2 is a view illustrating a coil cooling path and an engine clutch cooling path forming first and second oil scattering paths from among the three oil scattering paths according to the exemplary embodiment of the present invention.

FIG. 2 illustrates a detailed structure of the coil cooling path 20 and the engine clutch cooling path 30. In particular, the coil cooling path 20 may have a front bobbin scattering aperture 21 and a front coil scattering groove 23 (see FIG. 3). The front bobbin scattering aperture 21 may be formed radially of the circular body defining the internal space of the rotor sleeve 4 at the position outside the motor to scatter the oil filled in the internal space of the rotor sleeve 4 toward the external space of the rotor sleeve 4 (e.g., coil-positioned space) by centrifugal force according to the rotation of the rotor 3. The front coil scattering groove 23 may be formed in the bobbin 8 at the position outside the motor to scatter the oil scattered from the front bobbin scattering aperture 21 in the forward direction of the coil 9.

In particular, the engine clutch cooling path 30 may include a rear bobbin scattering aperture 31 and a rear coil scattering groove 33. The rear bobbin scattering aperture 31 may be formed axially along the circular body of the rotor sleeve 4 at the position inside the motor to scatter the oil filled in the internal space of the rotor sleeve 4 outward of the rotor sleeve 4 by centrifugal force according to the rotation thereof. Thus, the oil scattered from the rear bobbin scattering aperture 31 may be scattered toward the bobbin 8 via the sleeve gap 4-1 of the rotor sleeve 4, the retainer gap 5-1 of the retainer 5, and the rotor plate 6. The rear coil scattering groove 33 may be formed in the bobbin 8 at the position inside the motor to scatter the oil scattered from the rear bobbin scattering aperture 31 in the backward direction of the coil 9.

Figure 3:
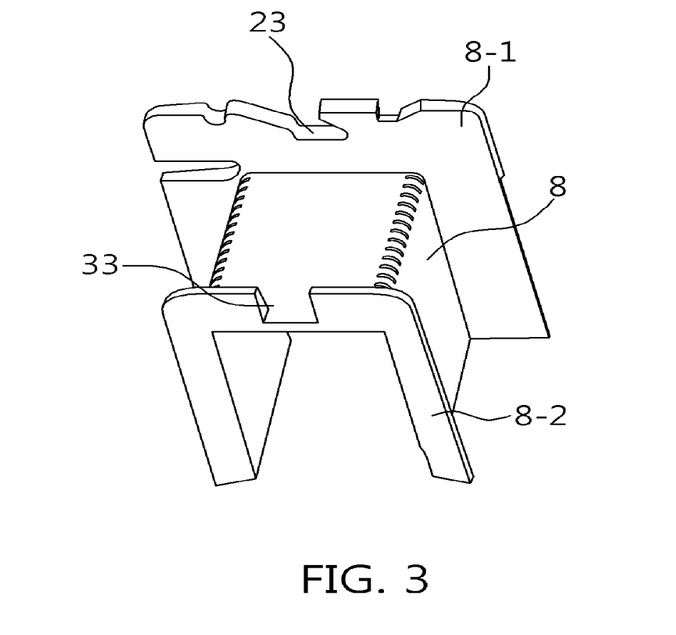
FIG. 3 is a view illustrating an example of a bobbin connected to the coil cooling path and the engine clutch cooling path according to the exemplary embodiment of the present invention.

Referring to FIG. 3, the bobbin 8 has a front flange 801 and a rear flange 8-2 that are respectively bent from both sides of the bobbin body by 90 degrees, and catches the coil wound around the bobbin body at the front and rear thereof. In particular, the front and rear flanges 8-1 and 8-2 may be modified in various shapes such that the scattered oil may be further guided and dispersed to the coil 9.

For example, the front coil scattering groove 23 may be formed in the front flange 8-1 by cutting a portion of the front flange 8-1 in a predetermined shape, and the rear bobbin scattering aperture 31 may be formed in rear flange 8-2 by cutting a portion of the rear flange 8-2 in a predetermined shape. Thus, the front coil scattering groove 23 allows the oil scattered from the front bobbin scattering aperture 21 of the coil cooling path 20 to be guided in the forward direction of the coil 9. Further, the rear bobbin scattering aperture 31 allows the oil scattered from the rear bobbin scattering aperture 31 of the engine clutch cooling path 30 to be guided in the backward direction of the coil 9.

Figure 4:
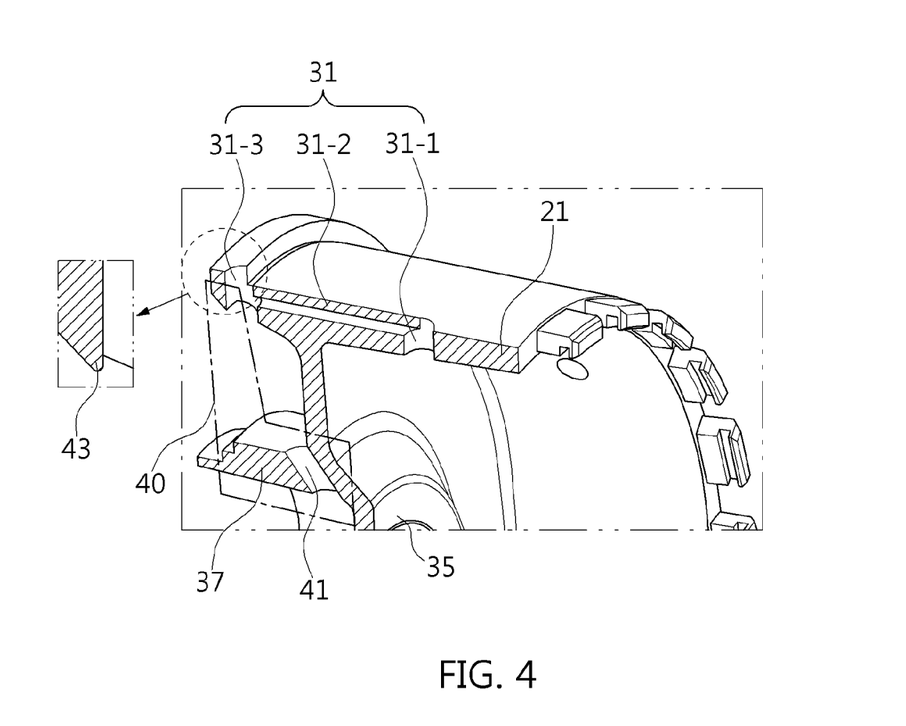
FIG. 4 is a view illustrating an engine clutch cooling path and a resolver cooling path forming second and third oil scattering paths from among the three oil scattering paths according to the exemplary embodiment of the present invention.

FIG. 4 illustrates a detailed structure of the resolver cooling path 40 connected to the engine clutch cooling path 30. In particular, the resolver cooling path 40 may be connected to the rear bobbin scattering aperture 31 of the engine clutch cooling path 30. Accordingly, the rear bobbin scattering aperture 31 may include an inlet passage 31-1, a connection passage 31-2, and an outlet passage 31-3. The inlet passage 31-1 may communicate with the internal space of the rotor sleeve 4 to operate as an inlet for inflow of oil. The connection passage 31-2 may form an oil flow path in which the oil introduced into the inlet passage 31-1 flows to the outlet passage 31-3. The outlet passage 31-3 may be formed in the rotor sleeve 4 such that the internal space of the rotor sleeve 4 communicates with the external space thereof. Particularly, the outlet passage 31-3 may be positioned on the oil scattering path of the resolver cooling path 40 such that the oil, which flows to the engine clutch via the inlet passage 31-1 and the connection passage 31-2, the oil, which is discharged from the resolver cooling path 40 to flow to the engine clutch, and the oil, which flows to the resolver, are collected and scattered in the backward direction of the coil 9.

For example, the connection passage 31-2 may be a rectilinear passage formed in the longitudinal direction of the rotor sleeve 4. The inlet passage 31-1 may be a rectilinear passage that leads vertically at a right angle from a first end of the connection passage 31-2 to communicate with the internal space of the rotor sleeve 4 for inflow of oil flowing to the engine clutch. The outlet passage 31-3 may be a rectilinear passage formed in the rotor sleeve 4 at a right angle from a second end of the connection passage 31-2. Accordingly, the inlet passage 31-1 and the outlet passage 31-3 may be positioned at the left and right sides of the connection passage 31-2. In particular, the resolver cooling path 40 includes a resolver passage 41 and an oil collection protrusion 43.

For example, the resolver passage 41 may be formed at an angle of inclination in a resolver boss 37 that protrudes in a concentric form with a shaft boss 35 formed on the circular body of the rotor sleeve 4. The angle of inclination is an angle formed by an imaginary line leading from the resolver passage 41 to the oil collection protrusion 43. The oil collection protrusion 43 may protrude from the rotor sleeve 4 to surround one surface of the outlet passage 31-3 in the portion of the outlet passage 31-3 of the rotor sleeve 4. In particular, the one surface of the outlet passage 31-3 refers to a position at which the oil scattered on the resolver passage 41 is away from the rotor sleeve 4.

Figure 5:
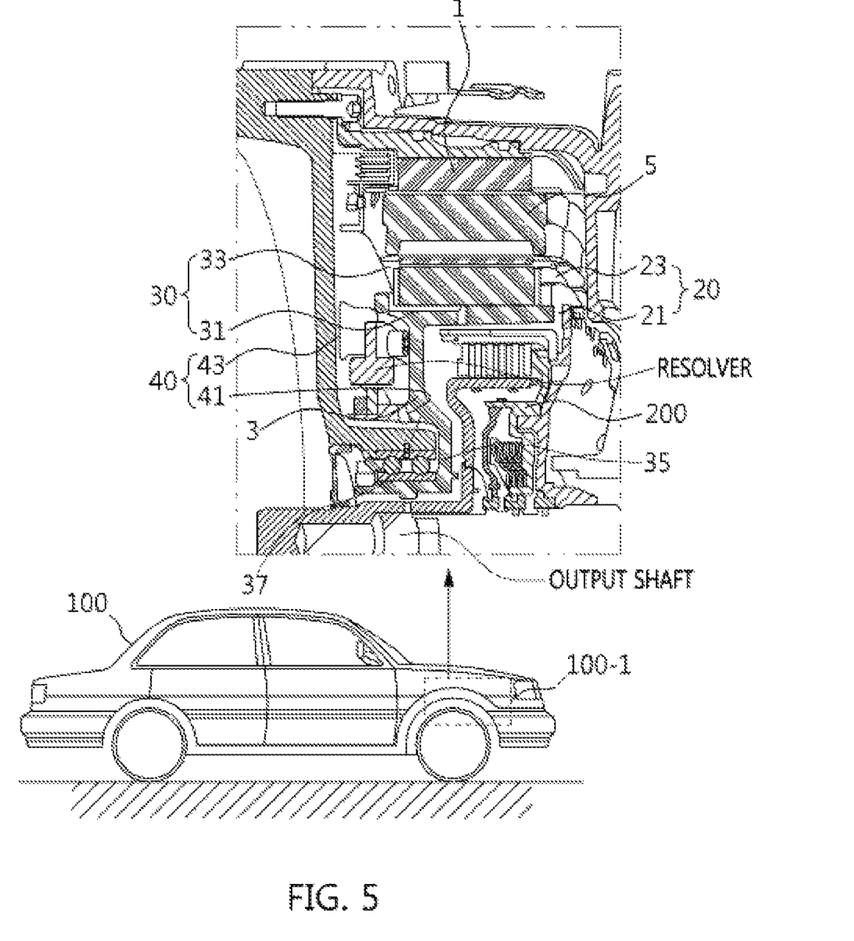
FIG. 5 is a view illustrating an example of an eco-friendly vehicle having a drive motor three oil scattering paths such as a coil cooling path, an engine clutch cooling path, and a resolver cooling path according to another exemplary embodiment of the present invention.
Figure 6:
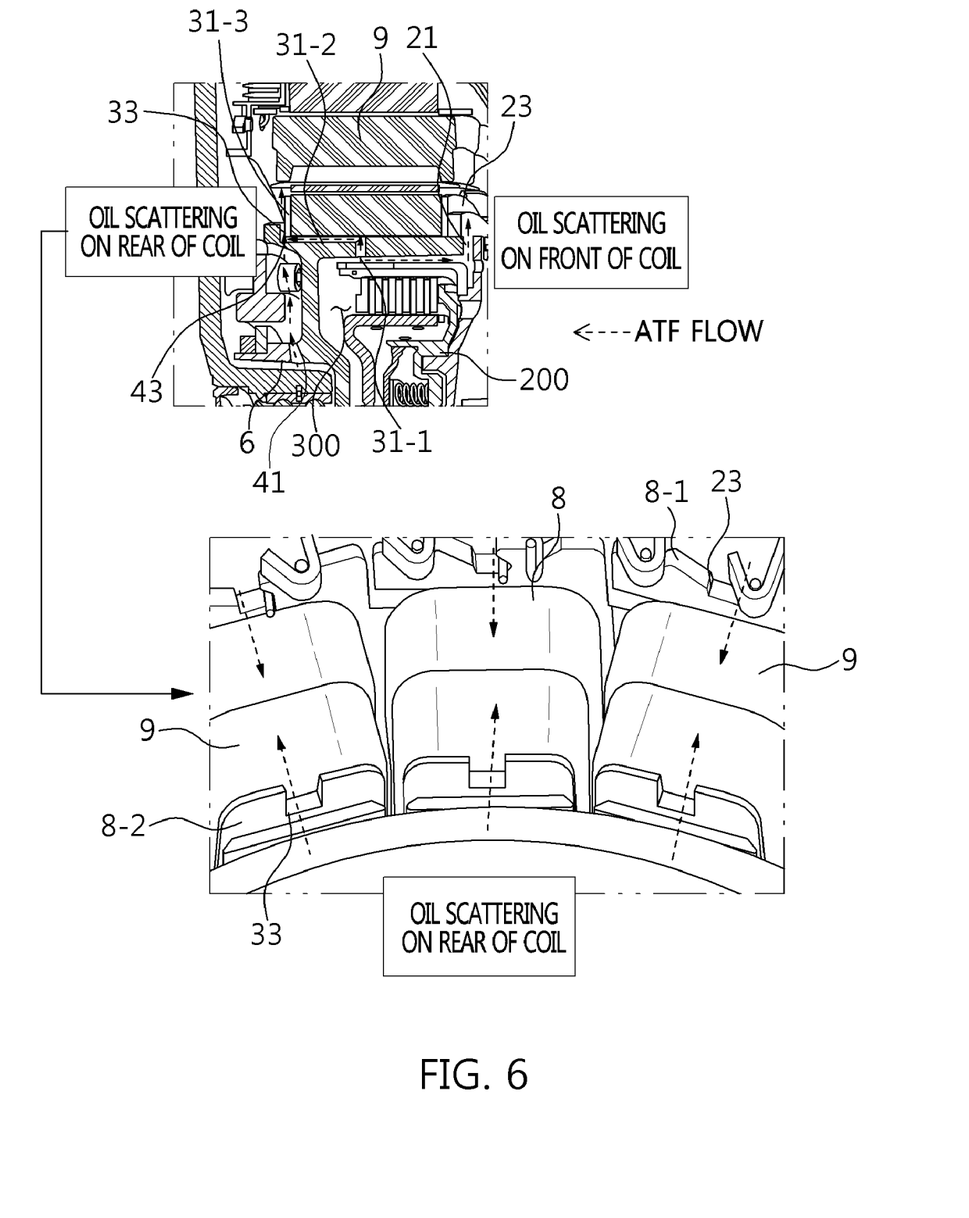
FIG. 6 is a view illustrating a state in which the drive motor of the eco-friendly vehicle is cooled in a three-dimensional manner in such a manner that oil is scattered onto the front and rear of a coil through three oil scattering paths formed of the coil cooling path, the engine clutch cooling path, and the resolver cooling path according to the exemplary embodiment of the present invention.

FIGS. 5 and 6 illustrate an example of an eco-friendly 100 to which a drive motor 1 is applied. Referring to FIG. 5, the eco-friendly 100 includes a drive motor 1 coupled to an engine clutch 200, and a transmission 100-1. In particular, the drive motor 1 is configured such that the engine clutch 200 is positioned in the internal space of a rotor 3, an output shaft is coupled to a shaft boss 35 of the rotor 3, and a resolver is positioned toward a resolver boss 37 of the rotor 3. The transmission 100-1 may be configured to change the speed of the vehicle by power transmitted from the drive motor 1.

Particularly, since the drive motor 1 is equal to the coil multi-cooling path type drive motor 1 described with reference to FIGS. 1 to 4, the driver motor 1 includes a coil multi-cooling path 10 connected to the rotor 3. Accordingly, the coil multi-cooling path 10 allows oil flowing to the engine clutch to be scattered in the forward direction of the coil 9 through a coil cooling path 20 to cool the front of the coil 9, and simultaneously allows oil flowing to the engine clutch and the resolver to be scattered in the backward direction of the coil 9 from a resolver cooling path 40 to an engine clutch cooling path 30 to cool the rear of the coil 9.

Referring to FIG. 6, the drive motor 1 may be filled with an auto transmission fluid (ATF) 300 supplied from the transmission 100-1 to the engine clutch 200. Accordingly, the drive motor 1 may be configured to output torque from the output shaft along with rotation of the rotor 3 by the current supplied from the coil 9. The ATF 300 is oil flowing to the engine clutch and may be supplied to the coil cooling path 20 and the engine clutch cooling path 30 by centrifugal force based on the rotation of the rotor sleeve 4 constituting the rotor 3. At the same time, the ATF 300 is oil flowing to the engine clutch and the resolve and may be supplied to the resolver cooling path 40.

The oil flowing to the engine clutch may be introduced into the front bobbin scattering aperture 21 and the inlet passage 31-1 of the rear bobbin scattering aperture 31 of the engine clutch cooling path 30. The oil flowing to the engine clutch and the resolver may be mixed with the oil flowing to the engine clutch to scatter the oil from the resolver passage 41 of the resolver cooling path 40 and introduce the oil into the outlet passage 31-3 of the rear bobbin scattering aperture 31 to reach the outlet passage 31-3 via the connection passage 31-2 from the inlet passage 31-1 of the engine clutch cooling path 30. In particular, the oil collection protrusion 43 of the resolver cooling path 40 may prevent the oil scattered from the resolver passage 41 from dispersing in the vicinity of the outlet passage 31-3.

Further, the oil scattered from the front bobbin scattering aperture 21 of the coil cooling path 20 may be scattered through the front coil scattering groove 23 of the bobbin 8 to wet the front of the coil 9. At the same time, the oil scattered from the outlet passage 31-3 of the engine clutch cooling path 30 may be scattered through the rear coil scattering groove 33 of the bobbin 8 to wet the rear of the coil 9. As a result, since the front of the coil 9 is wet by the oil flowing to the engine clutch and the rear of the coil 9 is wet by the oil flowing to the engine clutch mixed with the oil flowing to the resolver, the whole cooling efficiency of the coil may be increased by a sufficient amount of oil scattered on the coil 9. In addition, the oil scattered from the resolver cooling path 40 and the engine clutch cooling path 30 may directly cool the space of the stator 7. Therefore, it may be possible to apply the drive motor 1 to the eco-friendly vehicle with minimal effort to control the temperature of the drive motor due to the effective cooling performance of the drive motor 1.

As described above, the drive motor 1 applied to the eco-friendly vehicle 100 may include the coil multi-cooling path 10 having the coil cooling path 20, the engine clutch cooling path 30, and the resolver cooling path 40. Since the oil collected by the centrifugal force of the rotor sleeve 4 may be flow to the engine clutch and the resolver to be scattered in the forward and backward directions of the coil 9 and wet the front and rear of the coil 9 with interconnection of the coil cooling path 20, the engine clutch cooling path 30, and the resolver cooling path 40, it may be possible to maximize the whole cooling performance of the coil 9. Particularly, since the oil flowing to the engine clutch is mixed with the oil flowing to the resolver to be scattered onto the coil 9, it may be possible to directly cool the space of the stator 7 by a sufficient amount of oil in the oil scattering process.

The drive motor of the present invention has the following advantages and effects since it has a coil multi-cooling path structure at three oil scattering positions. Firstly, since total oil flowing to an engine clutch and a resolver is scattered on the front and rear of a coil in a three-dimensional manner, it may be possible to maximize a coil cooling effect by a sufficient amount of oil. Secondly, since oil is directly transferred to a stator when the oil is scattered on the front and rear of the coil, it may be possible to significantly enhance motor cooling performance as a whole. Thirdly, since three three-dimensional oil scattering structures such as a coil cooling path, an engine clutch cooling path, and a resolver cooling path are connected to a rotor, it may be possible to effectively scatter oil by the rotational force of the rotor. Fourthly, since a sliding groove and an oil collection jaw are connected to the oil scattering structure, it may be possible to effectively prevent the scattered oil from dispersing and to increase a rate of oil transferred to the coil. Fifthly, it may be possible to form a more effective cooling structure by optimally forming a bobbin around which the coil is wound. Sixthly, since a sleeve is connected to the oil scattering structure, it may be possible to apply the oil scattering structure anywhere oil is transferred to the stator. Seventhly, it may be possible to use oil left out in the resolver through the resolver cooling path for maximization of scattering. Eighthly, it may be possible to significantly enhance motor cooling performance without separate additional parts and costs by the oil scattering structure applied to the rotor sleeve and the bobbin.

In addition, in the eco-friendly vehicle of the present invention, the drive motor has improved cooling performance since it has a coil multi-cooling path structure at three oil scattering positions. Therefore, it may be possible to reduce an effort to control the temperature of the drive motor and particularly to increase motor durability and marketability by further improved coil cooling performance.

While the present invention has been described with respect to the exemplary embodiments, it will be apparent to those skilled in the art that various changes and modifications may be made without departing from the spirit and scope of the invention as defined in the following claims.

What is claimed is:

1. A drive motor, in which a coil is cooled in a three-dimensional manner, comprising:
   a coil multi-cooling path that collects oil by centrifugal force of a rotor,
   wherein the coil multi-cooling path includes:
      a coil cooling path through which the oil flowing to the engine clutch is scattered in the forward direction of the coil;
      an engine clutch cooling path through which the oil flowing to the engine clutch is scattered in the back direction of the coil; and
      a resolver cooling path through which the oil flowing to the resolver is scattered in the backward direction of the coil, and
   wherein the coil cooling path and the engine clutch cooling path are formed at intervals in a circular body that defines the internal space of the rotor sleeve, and the resolver cooling path is formed in a resolver boss protruding toward a shaft boss of the rotor sleeve to be blocked from the internal space.

2. The drive motor of claim 1, wherein the oil flowing to the resolver is mixed with the oil flowing to the engine clutch to be scattered in the backward direction of the coil.

3. The drive motor of claim 1, wherein the coil cooling path includes a front bobbin scattering aperture formed radially of a circular body of the rotor sleeve that defines the internal space, and a front coil scattering groove formed in a bobbin coupled to the coil to scatter the oil scattered from the front bobbin scattering aperture in the forward direction of the coil.

4. The drive motor of claim 1, wherein the engine clutch cooling path includes a rear bobbin scattering aperture formed in the rotor sleeve, and a rear coil scattering groove formed in a bobbin coupled to the coil to scatter the oil scattered from the rear bobbin scattering aperture in the backward direction of the coil.

5. The drive motor of claim 4, wherein the rear bobbin scattering aperture includes of an inlet passage, a connection passage, and an outlet passage, the inlet passage operates as an inlet for inflow of the oil, the outlet passage operates as an inlet for inflow of the oil scattered from the resolver cooling path to flow to the resolver together with an outlet through which the oil is scattered in the backward direction of the coil, and the connection passage connects the inlet passage to the outlet passage.

6. The drive motor of claim 5, wherein the connection passage has a rectilinear shape, the inlet passage communicates with a first end of the connection passage at a right angle, and the outlet passage is formed in the rotor sleeve to communicate with a second end of the connection passage at a right angle.

7. The drive motor of claim 1, wherein the resolver cooling path includes a resolver passage formed in a resolver boss of the rotor sleeve, and the oil flowing to the resolve is transferred to the engine clutch cooling path through the resolver passage.

8. The drive motor of claim 7, wherein the resolver passage has an angle of inclination to be directed toward the engine clutch cooling path.

9. The drive motor of claim 7, wherein the oil flowing to the resolver is transferred to an oil collection protrusion to be introduced into the engine clutch cooling path through the resolver passage.

10. The drive motor of claim 9, wherein the oil collection protrusion is formed in the rotor sleeve having the engine clutch cooling path formed therein.

11. The drive motor of claim 1, wherein the coil is wound around a stator, and the stator is cooled by coolant circulated in a cooling channel.

* * * * *